United States Patent [19]

Lewis, Jr. et al.

[11] Patent Number: 4,528,586
[45] Date of Patent: Jul. 9, 1985

[54] AUTOMATIC TINT CORRECTION WITH REDUCED COLOR SATURATION ERROR

[75] Inventors: Henry G. Lewis, Jr., Hamilton Square; Allen L. Limberg, Hopewell Township, Mercer County, both of N.J.

[73] Assignee: RCA Corporation, Princeton, N.J.

[21] Appl. No.: 487,107

[22] Filed: Apr. 21, 1983

[51] Int. Cl.³ .............................................. H04N 9/535
[52] U.S. Cl. ...................................................... 358/28
[58] Field of Search ............................................ 358/28

[56] References Cited

U.S. PATENT DOCUMENTS

| | | |
|---|---|---|
| 3,536,827 | 11/1967 | Bell . |
| 3,617,621 | 11/1971 | Cochran . |
| 3,649,748 | 5/1972 | Knauer . |
| 3,663,744 | 5/1972 | Harwood . |
| 3,852,807 | 12/1974 | Caprio et al. ........................ 358/28 |
| 3,873,760 | 3/1975 | Worden ............................... 358/21 |
| 3,996,608 | 12/1976 | Harwood ............................. 358/28 |
| 4,001,879 | 1/1977 | Nagaoka et al. .................... 358/28 |
| 4,004,140 | 1/1977 | Izumi et al. ........................ 235/152 |
| 4,084,178 | 4/1978 | Srivastaba et al. ................. 358/28 |

OTHER PUBLICATIONS

Harwood et al., "Chroma Circuit Design for the CTC-49", *RCA Engineer*, vol. 15, No. 5, Feb./Mar. 1971, pp. 15–19.

*Primary Examiner*—Richard Murray
*Attorney, Agent, or Firm*—E. M. Whitacre; P. J. Rasmussen; E. P. Herrmann

[57] ABSTRACT

In a color TV receiver, color saturation errors associated with flesh tone correction circuits operating on demodulated color mixture signals are corrected. This is accomplished by adding the absolute value of a fraction of one of the color mixture signals to the color mixture signal in quadrature phasing therewith.

17 Claims, 5 Drawing Figures

AUTOMATIC TINT CORRECTION WITH REDUCED COLOR SATURATION ERROR

BACKGROUND OF THE INVENTION

This invention relates to automatic tint correction in a TV receiver and more particularly circuitry for modifying hue in the region identified with flesh tones without introducing color saturation errors.

In conventional analog TV receivers, color demodulators recover quadrature-related color mixture signals e.g., I and Q or (R-Y) and (B-Y), by synchronous demodulation with a reference signal phase locked to the color subcarrier. The phase angle of the reference signal relative to the subcarrier determines the tint or hue of the image ultimately displayed. To correct the tint for user preference, etc., apparatus is generally provided to alter the phase of the reference signal relative to the subcarrier. In general, slight errors in hue or tint are not detectable by the observer since there is no reference based on previous information with which the viewer can make a comparison and, therefore, the tint adjustment is relatively non critical.

TV viewers are, however, particularly critical of displayed flesh tones. To accommodate this viewer sensitivity, TV receivers include auto flesh circuits which rotate the chrominance vector toward the flesh tone axis (e.g. the I color mixture signal axis) whenever the chrominance vector is close to the flesh tone axis. Rotation may be controlled by monitoring the relative magnitudes of the color mixture signals and generating a signal proportional to their ratio. This signal is then used to instantaneously adjust the phase of the reference signal applied to the synchronous demodulators so as to rotate the chrominance vector toward the flesh axis, whenever the ratio of the color mixture signals is in a range indicating that the currently received signal describes a hue that is near flesh color.

In TV receivers which are designed to digitally process video signals, baseband video from traditional analog IF circuitry is converted to digital format (PCM) by an analog-to-digital converter. In these receivers, static tint correction may be accomplished by adjusting the phase of the sampling clock of the analog-to-digital converter relative to the phase of the subcarrier. This method of tint control is similar to the phase adjustment of the reference signal applied to the synchronous demodulator in the aforedescribed analog receiver.

Dynamic tint control, as for flesh correction, generally cannot be achieved by phase modification of the sampling clock if tint is determined from the digitized signal. Consequently, it is advantageous to perform dynamic tint correction by manipulation of demodulated color mixture signals. This general form of tint correction has been considered in the past, but has not provided sufficiently good performance to achieve wide acceptance in commercial TV receivers.

R. F. Worden in U.S. Pat. No. 3,873,760 entitled "Flesh Tone Correction Using Color Difference Signals" and N. W. Bell in U.S. Pat. No. 3,536,827 entitled "Color Hue Error Correction Apparatus" illustrate and describe alternative apparatus for effecting tint correction by manipulation of the color mixture signals after demodulation. These systems scale the respective color mixture signals and add portions of the color mixture signals to each other to produce "corrected" color mixture signals, the vector sum of which describe a chrominance vector rotated relative to the received chrominance vector. The Worden and Bell systems are relatively simple to implement with analog circuits. However, the vector summation process involved in these same systems require successive multiplications of one variable quantity by another, the successive products being produced at the video sample rate. Fast binary multipliers are not attractive to implement in a TV receiver environment. There is also a tendency to reduce color saturation with this form of tint correction.

G. L. Caprio et al, in their U.S. Pat. No. 3,852,807 entitled "Automatic Hue Control Circuit", describe a simplified circuit for automatic flesh correction which operates only on the I and Q color mixture signals. The I and Q color mixture signals are compared to determine the relative phase of the signal with respect to the I or flesh color axis. When the phase of the chrominance signal is within a predetermined range of the I axis, e.g. within ±15 degrees) the supply of Q color mixture signal to the RGB matrix is completely attenuated. This effectively rotates the chrominance vector into alignment with the I axis, tending to produce true flesh hue throughout the predetermined range for tint correction. But unless hue correction is exercised over a narrower range than is normally desired, color saturation is reduced to an unacceptable degree.

SUMMARY OF THE INVENTION

It is an object of the present invention to perform automatic tint control by direct alteration of the color mixture signals without incurring excessive color saturation errors. Departure of hue from flesh tone is reduced for colors close to standard flesh tone by reducing the amplitude of the color mixture signal in quadrature phase with standard flesh tone. At the same time the tendency towards color saturation error inherent in this form of tint control is countered by increasing the amplitude of the color mixture signal on the flesh tone axis by a fraction of the magnitude of the color mixture signal in quadrature therewith. This augmentation of the flesh tone axis color mixture signal furthers hue being brought closer to standard flesh tone. In embodiments of the invention preferred for realization in digital circuitry, the fraction of the color mixture signal in quadrature with the standard flesh tone axis is a fixed fraction in each of one or more ranges of tint correction, to avoid the nececessity of having to multiply two variables at the video sampling rate.

This embodiment and further embodiments will be better understood from the following detailed description of the accompanying drawings.

DETAILED DESCRIPTION OF THE INVENTION

Figure 1:
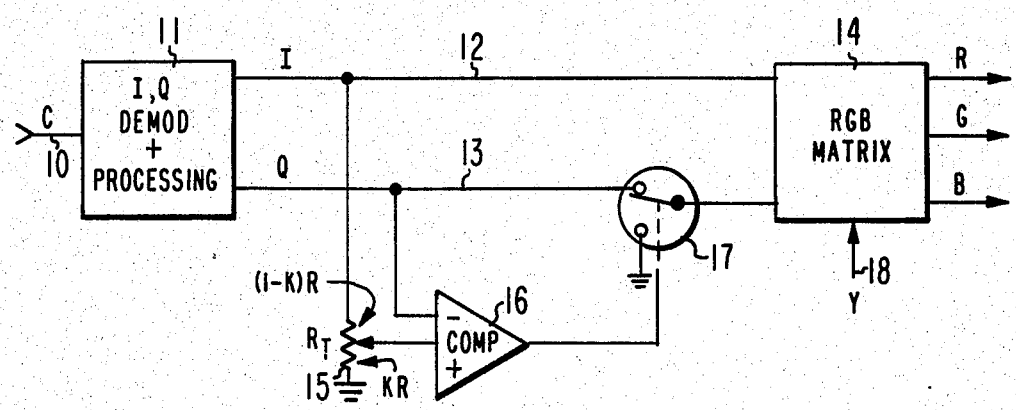
FIG. 1 is a partial block diagram of a prior art hue control circuit by G. L. Caprio et al.

FIG. 1 shows the aforementioned Caprio et al analog tint control circuit in schematic form. In the circuit, chrominance signal which has been separated from composite video is applied to input terminal 10 of color processing circuitry 11. Circuitry 11 typically includes I and Q demodulating circuits, peaking circuits, gain control and filters. A demodulated I color mixture signal is produced on connection 12 and a demodulated Q color mixture signal is produced on connection 13. The I color mixture signal is applied directly to an RGB matrix circuit. The Q color mixture signal is selectively applied via switch 17 to the RGB matrix circuit. There it is combined with the I color mixture signal and a luminance signal Y to generate red, green and blue signals for driving a kinescope display.

Switch 17 is controlled by output signal from comparator 16 which is directly connected to the Q output connection of circuitry 11 and connected through potentiometer 15 to the I output connection. Comparator 16 responds to an amplitude transition of the Q color mixture signal going through the value KI, where K is a factor determined by the potentiometer setting. When the magnitude of the Q color mixture signal is less than the magnitude KI, the supply of Q color mixture signal to the matrix 18 is attenuated to zero.

Figure 2:
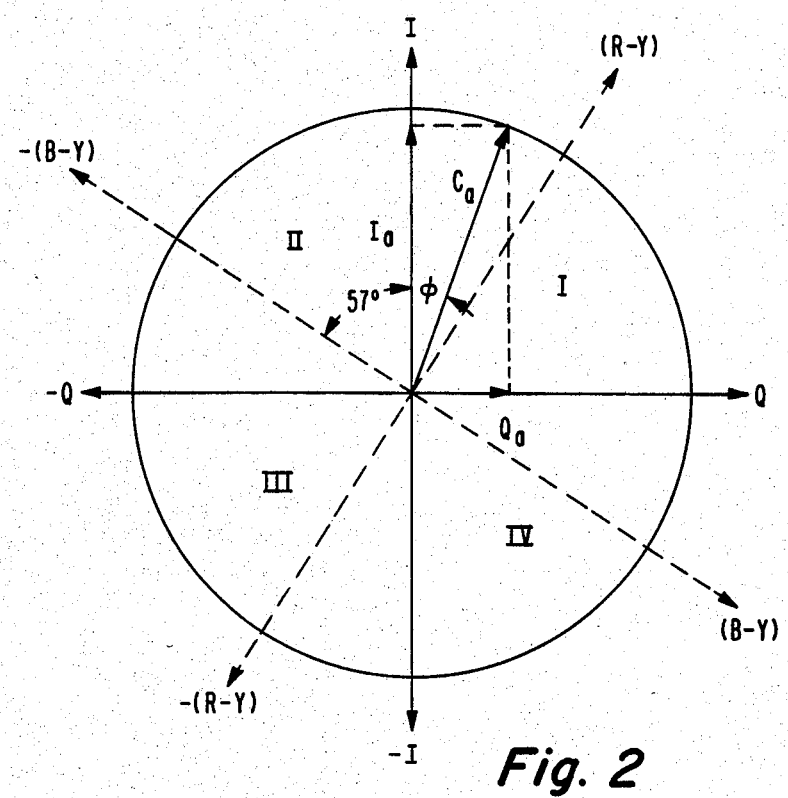
FIG. 2 is a vector diagram of conventional NTSC color video signals.
Figure 3:
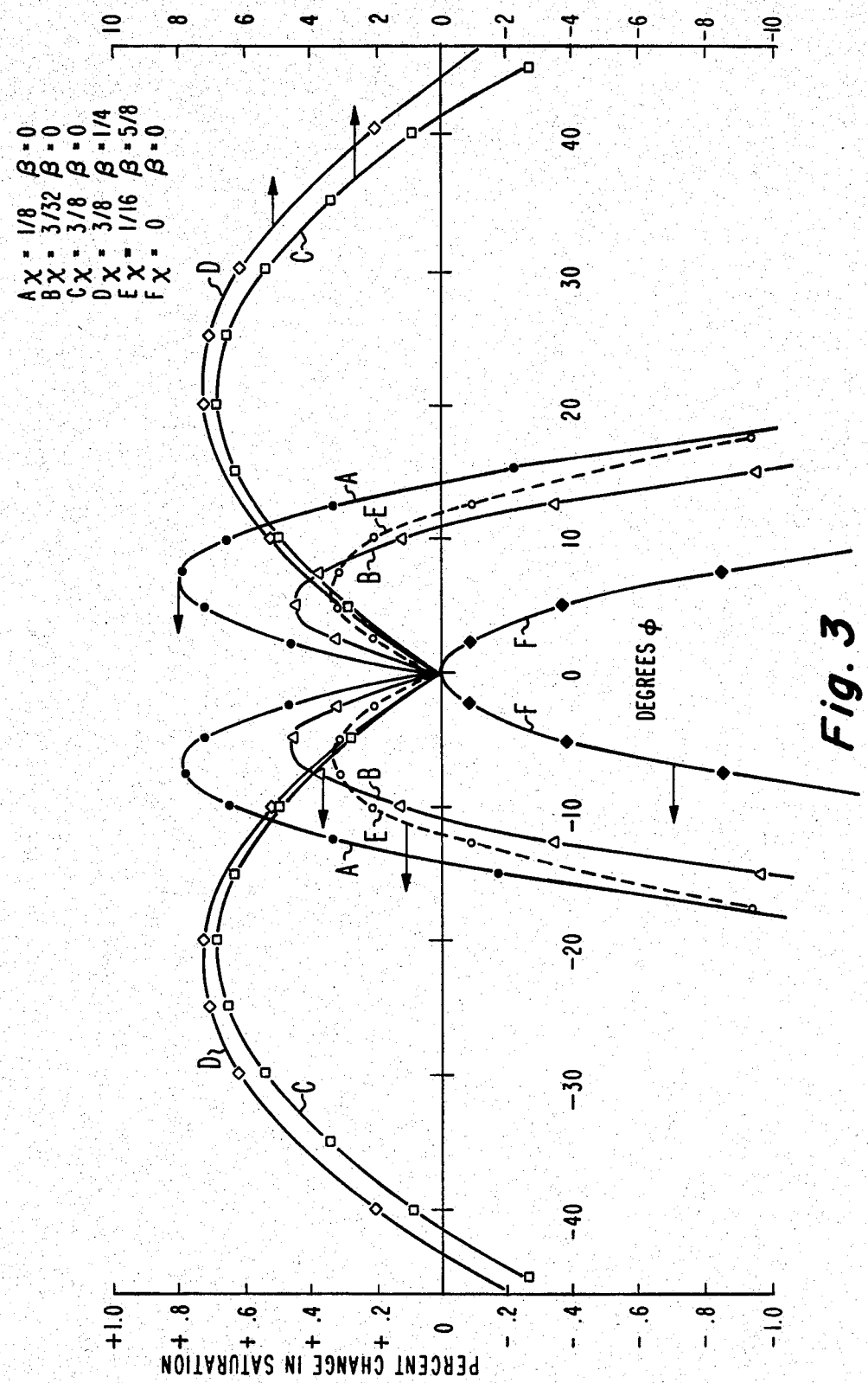
FIG. 3 is a graphical representation of the percent change in saturation of the rotated chrominance vector for forms of tint correction provided by the FIG. 1 apparatus and by automatic hue control apparatus embodying the present invention.

The effect of completely attenuating the supply of Q color mixture signal to the matrix 18 may be seen in FIGS. 2 and 3. FIG. 2 is a phase diagram of the vectors normally associated with video color signals. Both the quadrature related I and Q color mixture signal axes and the quadrature related (R-Y) and (B-Y) color mixture signals are included. The resultant, Ca, or vector sum of the current I and Q vectors Ia and Qa represents the current chrominance signal. The angle $\phi$ of any chrominance vector C (including Ca) with respect to the I axis is indicative of the hue and the magnitude of C is indicative of the color saturation.

When Qa is made zero, as when Q is not supplied to matrix 18, the vector C falls on the I axis. If the I axis is defined as the standard flesh tone axis, then the modified chrominance signal applied to the matrix 18 contains only the I component of flesh tones. However, since the Qa color mixture signal contributes to the magnitude of Ca, disabling Qa from the matrix 18 has the effect of reducing the magnitude of the vector C to a value equal to the magnitude of the current Ia color mixture signal.

The percent change in the magnitude of chrominance as a function of the angle $\phi$ is illustrated by the curve designated "F" in FIG. 3. The percent change is defined by the equation $$\text{percentage change} = 100 \times (Ca\text{-}Ia)/Ca \qquad (1)$$

and represents the percent change in saturation that occurs when the color mixture signal Qa is disabled and the current vector sum Ca is at angle $\phi$. The percentage change in color saturation is within a few tenths of one percent for $\phi$ less than 10 degrees but increases rapidly for $\phi$ greater than 10 degrees. At 15 degrees color saturation error is more than 3.5 percent; at 20 degrees more than 6.3 percent and at 45 degrees close to 70 percent. Thus, if the system of FIG. 1 is to be operated without appreciable change in color saturation, it is constrained to disable the Q color mixture signal only when the current chrominance vector Ca is within a limited range of degrees (e.g. ±10 degrees) from the I axis. This range is unacceptably narrow compared to that used in present day commercial TV receivers.

The present inventors realized that the range of operation of a FIG. 1 type system could be extended if the magnitude of the I color mixture signal were augmented by an amount related to the absolute value of angle $\phi$. The signal Qa represents a magnitude which as shown in FIG. 2 is related to the angle $\phi$ by $$Qa = Ca \sin \phi. \qquad (2)$$

As the angle $\phi$ increases from zero, the magnitude of Qa increases for constant Ca. This is the type of relationship required of the signal to be added to the Ia color mixture signal so that when Ca truly coincides with Ia, (i.e. $\phi = 0°$) there will be no change in the magnitude of the vector C.

Consider a system which, in a region close to the +I axis, disables Q and augments I with a fraction of the absolute magnitude of Q to perform automatic tint control. In this region, the magnitude of the modified chrominance vector Cc is $$Cc = Ia + \chi |Qa| \qquad (3)$$

where $\chi$ is an attenuation factor and $|Qa|$ is the absolute value of Qa. Since Ia and Qa are related by the angle $\phi$, a value of $\chi$ can be calculated which will render Cc and Ca equal in magnitude for a particular angle $\phi o$. From the trigonometric relationship $$Ia = Ca \cos \phi \qquad (4)$$

$$Qa = Ca \sin \phi \qquad (5)$$

combining equations (3), (4) and (5)

$$Cc = Ca = Ca \cos \phi o + \chi |Ca \sin \phi| \qquad (6)$$

and solving for $\chi$ $$\chi = (1 - \cos \phi o)/|\sin \phi o|. \qquad (7)$$

Choosing $\phi o$ at 14.3 degrees, for example, results in a value for $\chi$ of 0.125. If the percent difference between Cc and Ca is plotted for quadrant I and II of FIG. 2 as shown in curve A of FIG. 3, there will be a null at 0 degrees and a null at $\phi o = 14.3$ degrees. In between these points, Cc exceeds Ca but the percent difference over the range from 5 to 15 degrees is significantly less than for the FIG. 1 circuit.

Curves A, B and C of FIG. 3 are plots of the percent difference between Cc and Ca for three values of $\chi$. Each of the curves are zero at 0 degrees, go through a maximum and then pass through zero at points corresponding to respective $\pm \phi o$'s. Examining curve B, for example, it goes through a maximum at approximately 5 degrees and the absolute percent error is about equal to the absolute percent error of curve F. However, the percent error of curve B then decreases from 5 degrees to about 11 degrees where it crosses through zero and continues at no greater error to about 15 degrees. From the curves it will be recognized that the range of usefulness of a system represented by curve B significantly exceeds the range of usefulness of the system represented by curve F.

Curve C encompasses the relatively wide range of 100 degrees from $\phi = +50$ to $\phi = -50$ degrees. The greater the range covered, the greater is the percent change in Cc. But even for this broad a range, the change in magnitude of C is only eight percent rather than the twenty-nine percent color saturation error at 45 degrees exhibited by the system represented by curve F.

The curves A, B and C were generated using factors of χ which are multiples of reciprocals of powers of two. These values were chosen to simplify the circuitry to perform the weighting function in the digital or binary domain as will be demonstrated hereinafter.

Each of the curves A, B and C taken separately represent a system which aligns the chrominance vector C with the I axis in a single step. This tends to produce a chroma posterization effect where the tint correction angle is large. This posterization effect can be reduced by attenuating the Qa color mixture signal to the matrix 18 in several steps rather than in one complete attenuation step. In this instance, since some portion of the vector Qa remains to contribute to the chrominance angle, the vector C is rotated only partially toward the I axis. For small to moderate ranges of angle φ (e.g. ±30 degrees) augmentation of signal I by the absolute value of Q for saturation control is relatively independent of attenuation of signal Q for rotation of the chrominance vector. This may be appreciated by reference to FIG. 2 from which one can recognize that in this angular range the I signal (or the I signal linearly augmented by |Q|) is the major factor in determining the magnitude of the chrominance vector C. The smaller Q signal in quadrature is only a minor factor. However, note that even though the magnitude of signal Qa is relatively small in this range and has little effect on the magnitude of the chrominance vector, it maintains significant impact on the value of the angle φ; and modest changes in the magnitude of signal Q will cause significant changes in angle φ. The fact that color saturation correction can be obtained by augmenting I with |Q| without substantially diluting tint correction by methods similar to any of those described by Caprio et al., Bell and Worden, is a significant advantage of this invention.

Let the factor by which the Q color mixture signal is attenuated equal β. It can be shown that β is related to χ and the zero crossing by the equation $$\beta^2 = 1 - \chi^2 - 2\chi \cot \phi_0 \quad (8)$$

where φo is the desired angle at which the new vector Cc equals the current vector Ca. Using equation 8, by selecting values for φo and χ, values for β can be calculated. Corrected I and Q color mixture signals, Ic and Qc, are generated according to the equations $$Ic = Ia + \chi |Qa| \quad (9)$$

and $$Qc = \beta Qa. \quad (10)$$

The magnitude of the corrected chrominance vector Cc is given by the equation $$Cc = \sqrt{Ic^2 + Qc^2} \quad (11)$$

Curves D and E of FIG. 3 were generated using equation (11) and the values of χ and β listed on the drawing. Curve D and Curve C were generated with the same value for χ. Curve D exhibits some loss in color saturation correction, but the condition is small and preferable to the chroma posterization that might otherwise result.

Figure 4:
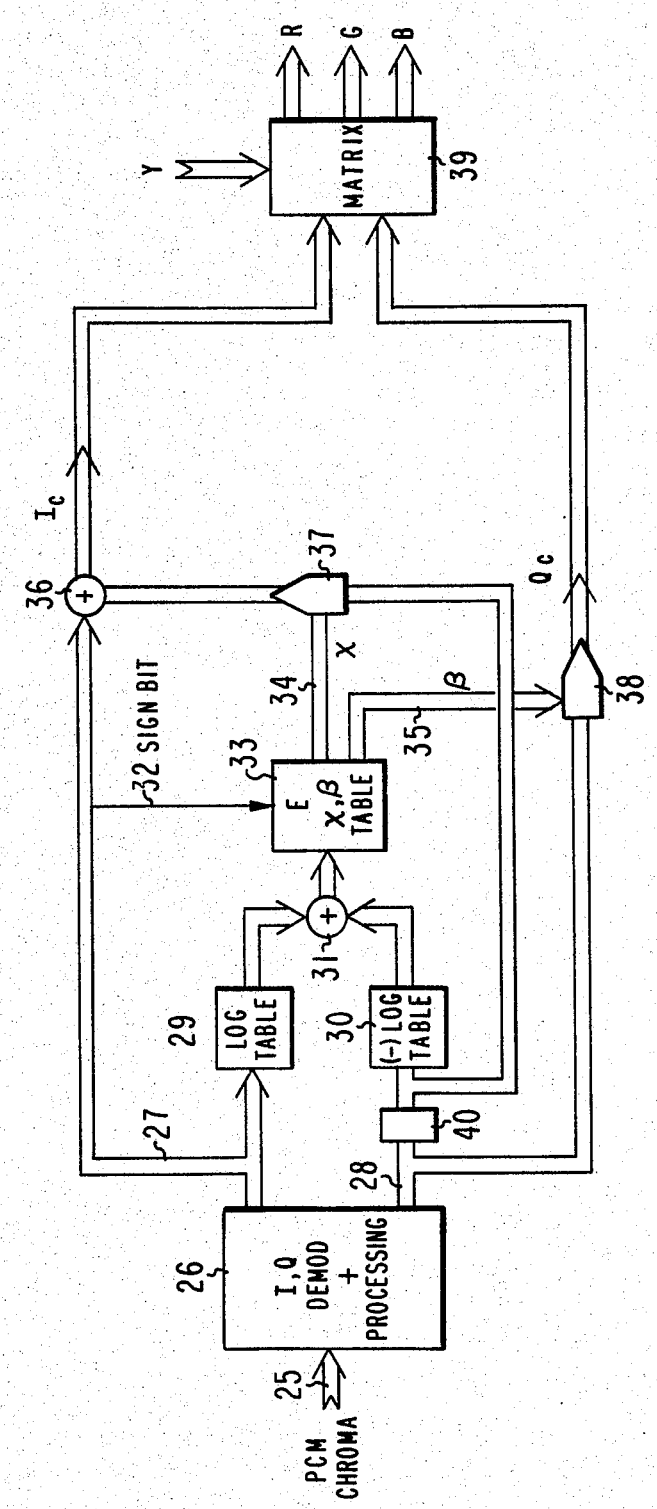
FIGS. 4 and 5 are block diagrams of portions of digital TV receivers having automatic tint control apparatus embodying the present invention.

FIG. 4 illustrates circuitry for performing automatic tint control by augmenting the I color mixture signal and attenuating the Q color mixture signal. The representative circuitry is described in terms of binary processing circuitry operating on binary signals. However, the invention may be similarly practiced on analog signals with equivalent analog circuitry. A PCM chrominance signal available on connection 25 (assumed to be a parallel 8 bit bus) is applied to digital processing circuitry 26. Circuitry 26 may include an I and Q demodulator, peaking circuitry and passband FIR filters. A digitized I binary color mixture signal Ia and a digitized Q binary color mixture signal Qa are produced on connections 27 and 28, respectively. Since the values of I and Q may have both positive and negative values (FIG. 2) the I and Q signals will be assumed to be in two's complement format, wherein the most significant bit position of the signal indicates signal polarity.

The Ia color mixture signal is applied to one input of a binary ADDER 36 and as an address code to a read only memory (ROM) 29. ROM 29 is programmed to produce at its output port the logarithm of the respective address code supplied to its input port, which logarithms are applied to one input port of ADDER 31. Note only the logarithms of positive values of I need be programmed into ROM 29 since dynamic tint correction is performed only when the I signal is positive, as will become clear later in this description.

The Qa binary color mixture signals are applied to absolute value circuit 40 which passes positive values of Qa as address codes to ROM 30 and, for example, two's complements and passes negative values of signal Qa as address codes to ROM 30. Circuit 40 effectively passes |Qa|, the magnitude or absolute value of Qa signals to the ROM 30. ROM 30 is programmed to produce at its output port, signals corresponding to the negative logarithm of the respective address codes applied. The negative logarithms of Qa are applied to a second input port of ADDER 31 which produces at its output binary signals corresponding to log (Ia/|Qa|) which is proportional to the log cotangent of the angle φ between the signal vectors Ca and Ia. The log (Ia/|Qa|) signals from ADDER 31 are applied as address codes to circuit 33 which may be a ROM or a programmable logic array, or other appropriate circuitry. The separate log tables stored in ROM's 29 and 30 can be replaced by a single log table in ROM if the address codes depending from Ia and Qa are multiplexed to its input and the output therefrom is demultiplexed to a subtractor circuit rather than ADDER 31.

Circuit 33 is programmed to produce two coefficients, χ and β, on output ports 34 and 35, respectively for address codes corresponding to particular angles defined by the arc cotan (Ia/|Qa|). For example, for all log (Ia/|Qa|) address codes corresponding to values of (Ia/|Qa|) less than one, (φ greater than ±45 degrees) circuit 33 may produce a χ value of zero and a β value of one so that the I and Q signal values are passed to the matrix 39 unaltered. For values of (Ia/|Qa|) corresponding to angles between ±45 degrees and ±30 degrees, circuit 33 may produce χ and β coefficients of ⅜ and ¼, respectively. For angles between 30 and 20 degrees, different $\chi$ and $\beta$ values may be supplied, and so forth.

From FIG. 2, it will be noted that color signals approaching flesh tones occur only in quadrants I and II where the I vector is positive. Thus, the vector C, for auto-flesh correction, should only be rotated when its present position is in quadrants I and II. To insure this condition, the sign bit 32, (logic zero for positive values of I and logic one for negative values of I) is applied to circuit 33 to clamp the $\chi$ and $\beta$ values at zero and one, respectively, when the vector Ia is negative.

The binary signal $|Qa|$ from element 40 is applied to weighting circuit 37 to which the weighting coefficient $\chi$ is applied via connection 34. The binary signal Qa is applied to weighting circuit 38 to which the weighting coefficient $\beta$ is applied via connection 35. Weighting circuit 37 weights $|Qa|$ from absolute value circuit 40 by $\chi$, producing the attenuated signal $\chi|Qa|$, which is applied to a second input port of ADDER 36. The output signal Ic from ADDER 36 equals Ia+$\chi|Qa|$ which is applied to a matrixing circuit 39. The absolute value $|Qa|$ is weighted and added to Ia, rather than the arithmetic value of Qa being so weighted and added, to maintain saturation symmetry about the I axis, since the magnitude of I must be increased regardless of the polarity of Qa when Qa is attenuated.

Weighting circuit 38 weights the signal Qa by the factor $\beta$, producing the signal Qc=$\beta$Qa, which is applied to matrix 39 where it is combined with signal Ic and a luminance signal Y to generate the red, R, green, G, and blue, B, color signals for ultimately driving a kinescope display.

Weighting circuits 37 and 38 may be of the shift and add type which are economical of parts count. See, for example, U.S. Pat. No. 4,004,140 entitled "Digital Attenuator" for a description of a shift and add attenuator and incorporated herein by reference. If the application permits of employing coefficients which are simple reciprocals of powers of two, the weighting circuits may be binary bit position shift circuits. In a further simplified arrangement, weighting circuit 38 may be implemented with a switch (N bits) similar to switch 17 of the FIG. 1 circuit.

The determination of the angle $\phi$ need not be calculated with high precision. For example, supposing the Ia and Qa signals to be in seven bit plus sign bit format; only the three or four most significant information bits of each signal need be applied to ROM's 29 and 30. If three bit addresses are employed, the respective ROM's will contain only $2^3$ or eight logarithm values. Thus, the ROM's used in determining the angle $\phi$ can be economical in part size. Further, if only one variation of coefficients is to be applied to each of the weighting circuits 37 and 38, i.e., $\chi=\chi_1$ or zero to circuit 37 and $\beta=\beta_1$ or one to circuit 38 where $\chi_1$ and $\beta_1$ are fixed constants, then circuit 33 may be replaced with a threshold detector and a simple multiplexor. In this instance, when the log (Ia/$|Qa|$) exceeds a predetermined value, determined by the threshold detector, the threshold detector would generate a control signal to change the state of the multiplexor. The multiplexor responsive to the control signal would switch the signal on port 34 between zero and the value $\chi_1$. Simultaneously, it would switch the coefficient on port 35 from the value one to the value $\beta_1$.

It is preferable, from the standpoint of present commercial practice, to have facility to switch between a number of coefficient values for $\chi$ and $\beta$. The $\chi$ and $\beta$ coefficient values should be chosen to rotate the chrominance vector by a lesser amount when it is distant from the flesh tone axis or is very close to the flesh tone axis. At intermediate angles, (10–25 degrees for example) $\chi$ and $\beta$ values should be provided to cause a greater rotation of the chrominance vector. It is at the intermediate angles that apparent flesh tones would appear to be most off color and require greater correction. Rotation of the chrominance vector in such stepwise fashion minimizes the posterization effect.

Figure 5:
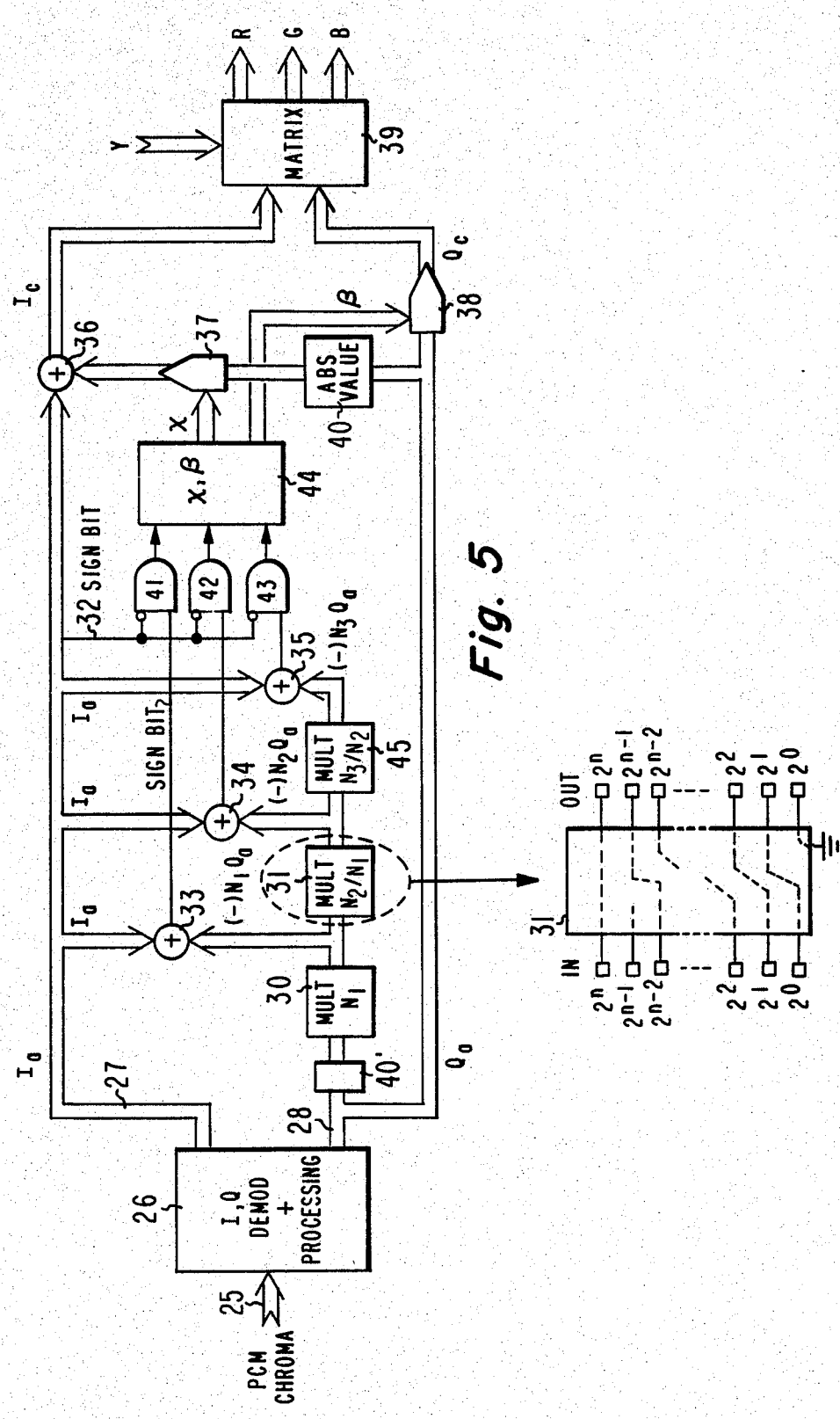

FIG. 5 is a variant of the FIG. 4 tint control wherein a simplified angle detector is implemented. In FIG. 5, elements sharing the same designation numbers with elements in FIG. 4 are equivalents.

The FIG. 5 phase angle detector operates according to the following relationship. The cotangent of angle $\phi$ is equal to Ia/Qa. Let us define a value N according to the following.

$$N = Ia/Qa \tag{12}$$

$$Ia = NQa. \tag{13}$$

Let NQa be subtracted from Ia. The difference is zero, positive or negative depending on whether the phase angle equals, is lesser than, or is greater than the angle corresponding to the $\cot^{-1}$ of the particular value chosen for N. For example, if Qa is subtracted from Ia, i.e., N=1, positive or negative differences indicate angles $\phi$ lesser than or greater than 45 degrees, respectively. As a second example, positive or negative differences produced by the subtractively combining Ia and 2Qa indicate that the angle $\phi$ is respectively lesser or greater than $\cot^{-1}(2)$ or 27 degrees.

The FIG. 5 embodiment includes a phase angle $\phi$ detector designed to detect the angle in quantized steps. This is accomplished by parallel circuits which concurrently perform the subtraction function for three values of N. The results of the parallel subtraction circuit are decoded by combinational logic and subsequently generate the aforedescribed weighting factors $\chi$ and $\beta$.

In the Figure, the Qa color mixture signal is applied to circuit 40' which two's complements positive values of Qa signal samples and passes unaltered negative values of the Qa signal samples. Thus, circuit 40' supplies only negative absolute values $-|Qa|$ of the signal Qa to the input port of multiplier circuit 30. Circuit 30 multiplies the $(-)|Qa|$ samples by a positive factor N1 to produce the signal samples $(-)N1|Qa|$ which are applied to the input port of a second multiplier circuit 31 and to one input port of a binary ADDER 33. Multiplier 31 multiplies the $(-)N1|Qa|$ signal samples by a positive factor producing at its output port the signal samples $(-)N2|Qa|$ which are applied to the input port of a further multiplier circuit 45 and to one input port of the ADDER 34. Multiplier 45 multiplies the samples $(-)N2|Qa|$ by a still further factor to generate the signal samples $(-)N3|Qa|$ which are applied to one input port of ADDER 35. (It should be readily appreciated that instead of the cascade connection shown in FIG. 5, the multipliers 30, 31 and 45 may have their input ports connected in parallel to the output port of element 40' with appropriate adjustment of factors N1, N2 and N3.)

ADDER circuits 33, 34 and 35 each have second input ports coupled to receive the Ia color mixture signal. ADDERS 33, 34 and 35 sum the two signals applied to their respective input ports according to the equations:

$$S33 = Ia + (-N1|Qa|) = Ia - N1|Qa| \quad (14)$$

$$S34 = Ia - N2|Qa| \quad (15)$$

$$S35 = Ia - N3|Qa|. \quad (16)$$

Most of the bit positions in the sums S33, S34 and S35 may be disregarded. The desired information resides entirely in the sign bit (assuming two's complement addition). If the respective sign bits from the adder are logical one's, the differences are negative, and if zero's, the differences are positive. The sign bits from AD-DERs 33, 34 and 35 determine if the angle $\phi$ is lesser or greater than $\cot^{-1}$ (N1), $\cot^{-1}$ (N2) or $\cot^{-1}$ (N3), respectively, and combination of these sign bits will determine if the phase angle lies between the detection angles established by the values assigned N1, N2 and N3.

The respective sign bits of ADDERs 33, 34 and 35 are coupled to respective first input terminals of AND gates 41, 42 and 43. AND gates 41, 42 and 43 each have second inverting input terminals connected to the sign bit line of the Ia signal bus 27. The Ia sign bit conditions AND gates 41, 42 and 43 to function as signal transmission gates. When Ia color mixture signal is positive, its sign bit is a logical zero which enables each of the AND gates 41, 42, 43 to pass signal supplied to its second input terminal to its output terminal. The sign bits from AD-DERs 33, 34 and 35 are thereby applied as address codes to circuit 44 whenever the Ia color mixture signal is positive. When the Ia signal is negative, the output signals from AND gates 41, 42 and 43 are clamped low. Note the incorporation of AND gates 41, 42 and 43 is for illustrative purposes. A like result can be achieved by excluding the AND gates and gating the ADDERS 33, 34 and 35 or the element 44 with the Ia signal sign bit. As in the FIG. 4 element 33, circuit 44 may be a ROM or a PLA programmed to produce specific weighting coefficients $\phi$ and $\beta$ for the particular address code applied.

Generally, the angles of flesh tone detection are not critical. Therefore, the ADDERS 33, 34 and 35 and the multipliers 30, 31 and 45 may have fewer bit positions than the Ia and Qa signal busses. Further, if the factors N1, N2 and N3 are integral powers of 2, e.g., 2, 4 and 8, multipliers 30, 31 and 45 may be simple hard wired bit position shifters as shown in the FIG. 5 inset. One skilled in the art of binary signal processing knows that a simple bit position shift left or shift right respectively multiplies or divides a binary number by two, two shifts provides a multiplication or division by four, and a shift of three bit positions performs a multiplication or division by eight.

If the multipliers 30, 31 and 45 in FIG. 5 are each realized with one bit left shift elements, the factors N1, N2 and N3 equal 2, 4 and 8. Consequently, ADDER 33 determines when the chrominance angle is greater or less than 27 degrees, ADDER 34 determines when the chrominance angle is greater or less than 14 degrees and ADDER 35 determines when the angle is greater or less than 7 degrees. The three ADDERs generate 4 possible address codes that are applied to circuit 44. The coefficient values $\chi$ and $\beta$ can therefore be changed three times from their normal values of zero and unity as the chrominance vector Ca traverses from ±30 to ±5 degrees to produce desired color corrections as the vector makes this excursion. Naturally, additional angle detectors may be incorporated to provide for more angle ranges if desired.

The FIG. 5 angle detector may also be configured with dividers between the Ia signal bus and the ADDERs 33, 34 and 35 rather than with multipliers 30, 31 and 45 in the Qa signal paths, or it may be realized with a combination of both. For dividers which are to perform division by simple powers of two, shift right bit shifters may be implemented for this function.

This invention has been described with reference to I and Q quadrature color mixture signals for the purpose of correcting flesh tones.

The actual standard flesh tone axis and the axis in quadrature therewith may be rotated somewhat from the standard I and Q axes. The degree of rotation can be several degrees without incurring unacceptable shift in high-frequency tint in a TV receiver using wide band chrominance detection. There are no adverse effects in a TV receiver with only 0.5 MHz chrominance response. However, it is applicable in general to any quadrature color signals A1 and A2 for the correction of other colors as well as flesh tones.

What is claimed is:

1. In a TV receiver including a source of quadrature color mixture signals A1 and A2, a matrix responsive to signals A1 and A2 for generating RGB signals, and apparatus for generating signals A1' and A2' responsive to signals A1 and A2 for automatically adjusting a prescribed color, said apparatus comprising:
   means responsive to the A1 and A2 color mixture signals for generating control signals when the magnitude of A1 exceeds the magnitude of A2 by a predetermined amount;
   means responsive to said control signals for selectively attenuating signal A2 to generate signal A2'; and
   means responsive to said control signals for selectively augmenting signal A1 by linearly combining it with a predetermined portion of signal A2 to generate signal A1'.

2. The apparatus set forth in claim 1 wherein the means for generating said control signal comprises:
   means coupled to said source and responsive to signal A1 for producing at an output port thereof, logarithms corresponding to values of the signal A1;
   means coupled to said source and responsive to signal A2 for producing at an output port thereof, logarithms corresponding to values of the signal A2;
   means coupled to the output ports of said first and second means for linearly combining the logarithmic responses; and
   means responsive to prescribed ranges of the linearly combined logarithmic responses for providing said control signals.

3. The apparatus set forth in claim 2 wherein the means for attenuating the signal A2 comprises a weighting circuit coupled to receive the signal A2 and responsive to said control signals to completely attenuate signal A2 to zero when said linearly combined logarithmic responses fall within said prescribed ranges and to weight the signal A2 by unity otherwise.

4. The apparatus set forth in claim 2 wherein said A1 and A2 signals are supplied in digitized sampled-data form; said means responsive to signal A1 for producing logarithms corresponding to values of the signal A1 are provided by a read only memory addressed in response to signal A1, wherein said means responsive to signal A2 for producing logarithms corresponding to values of the signal A2 comprises means for determining the absolute values of A2 samples and a read only memory addressed by these absolute values.

5. The apparatus set forth in claim 4 wherein the means for adding a portion of the signal A2 to the signal A1 comprises:
 a weighting circuit serially coupled to the source of signal A2 samples and responsive to the said control signal for producing at an output port thereof weighted replicas of the signal A2; and
 an ADDER for adding said weighted replicas and signal A1 samples to form the A1' samples.

6. The apparatus set forth in claim 5 wherein the means for linearly combining the logarithmic responses comprises an ADDER having first and second input ports respectively coupled to the output ports of the read only memories.

7. The apparatus set forth in claim 1 wherein the means for generating control signals comprises:
 means coupled to the source of signal A2 for producing at an output port thereof the absolute value $|A2|$ of signal A2;
 means responsive to the absolute values of signal A2 for generating the product, $N|A2|$, of the absolute value of signal A2 times a constant N;
 means coupled to the source of signal A1 and said means for generating the product $N|A2|$, for determining the difference between the values A1 and $N|A2|$; and
 means responsive to the polarity of signal A1 and coupled to the means for determining the difference between A1 and $N|A2|$ for passing to an output port thereof, signal corresponding to the polarity of the difference only when signal A1 is a predetermined polarity.

8. The apparatus set forth in claim 7 wherein signals A1 and A2 are sampled data binary signals and the means for producing the absolute value of signal A2 includes a two's complementing circuit.

9. The apparatus set forth in claim 8 wherein the means for generating the product $N|A2|$ is a left bit shift circuit and the means for determining said difference is a binary ADDER.

10. In a TV receiver including a source of sampled data quadrature color mixture signals A1 and A2, apparatus for automatically adjusting the hue represented by the vector sum of the signals A1 and A2 comprising:
 means responsive to the magnitude of the signals A1 and A2 for generating sets of weighting coefficients $\chi$ and $\beta$;
 means responsive to the $\beta$ weighting coefficients for attenuating the A2 signal samples;
 means responsive to the A2 signal for generating a signal $|A2|$ corresponding to the absolute signal sample value of A2;
 means responsive to the $\chi$ weighting coefficients for attenuating the $|A2|$ signal;
 means including an ADDER circuit responsive to the A1 signal samples and the means for attenuating the $|A2|$ signal for producing sums of A1 signal samples plus the $|A2|$ signal samples weighted by the $\chi$ coefficient; and
 further utilization means receptive of said sums and attenuated A2 signal samples from the means for attenuating the A2 signal samples.

11. The apparatus set forth in claim 10 wherein the means for generating coefficients $\chi$ and $\beta$ comprises:
 means including a multiplier coupled to said source of A1 and A2 signal samples for multiplying one of said A1 and A2 signal samples by a constant factor N;
 means having a first input coupled to the source of A1 and A2 signal samples for supplying the other of said A1 and A2 signal samples thereto, and a second input coupled to the output of said multiplier, for generating a signal indicating the polarity of the difference of the signal samples supplied thereto;
 means responsive to the polarity of the A1 signal samples and the means for generating a signal indicating the polarity of the difference of the samples supplied thereto, for producing coefficients $\chi$ and $\beta$ of first predetermined values when the A1 signal samples and said difference are a first polarity, of second predetermined values when the A1 signal samples are of a first polarity and said difference is of a second polarity, and of values zero and unity when the A1 signal samples are of a second polarity.

12. The apparatus set forth in claim 11 wherein the means for producing coefficients $\chi$ and $\beta$ comprises a storage device having an address input coupled to said means for generating an indication of polarity and being programmed to produce at output terminals thereof, preselected coefficient values for respective address signals.

13. The apparatus set forth in claim 11 wherein the multiplier comprises a binary bit shift left device.

14. The apparatus set forth in claim 11 wherein the means for generating an indication of polarity includes a two's complement ADDER having a sign bit output.

15. The apparatus set forth in claim 10 wherein the respective attenuating means are respective shift and add weighting circuits.

16. The apparatus set forth in claim 10 wherein the means for generating coefficients $\chi$ and $\beta$ comprises:
 means coupled to said source and responsive to the A1 sampled data signal for producing at an output port thereof, logarithms corresponding to the respective A1 signal samples;
 means coupled to said source and responsive to the A2 sampled data signals for producing at an output port thereof, logarithms corresponding to respective A2 signal samples;
 means coupled to the output ports of said means for producing the logarithms of the A1 signal samples and the A2 signal samples, for producing the logarithms of the A1 signal samples divided by the A2 signal samples; and
 means responsive to the logarithms of (A1/A2) for producing predetermined coefficients $\chi$ and $\beta$ for values of log (A1/A2) corresponding to selected angles equal to the $\cot^{-1}$ (A1/A2) only when the A1 signals are a predetermined polarity.

17. In a TV receiver including a source of sampled data quadrature phased color mixture signals A1 and A2, apparatus for automatically adjusting the tint represented by the vector sum of the signals A1 and A2, including means for detecting when the hue is within a range of colors, comprising:
 first means coupled to said source for multiplying one of said signals A1 and A2 by a constant N;
 second means coupled to said source and said first means for generating a control signal corresponding to the polarity of the difference of the signal multiplied by the constant and the other signal; and
 third means responsive to a predetermined polarity of one of said signals A1 and A2 for gating the control signal to further utilization means.

* * * * *